Nov. 1, 1966

T. B. ORTWIG ET AL 3,283,214

SEPARABLE TYPE ELECTRIC DISCONNECT

Filed March 2, 1964

INVENTORS
THOMAS B. ORTWIG
BY JOSEPH L. KRAWINKEL JR.

ATTORNEY

Nov. 1, 1966  T. B. ORTWIG ET AL  3,283,214

SEPARABLE TYPE ELECTRIC DISCONNECT

Filed March 2, 1964

Nov. 1, 1966   T. B. ORTWIG ET AL   3,283,214
SEPARABLE TYPE ELECTRIC DISCONNECT
Filed March 2, 1964   7 Sheets-Sheet 3

Nov. 1, 1966  T. B. ORTWIG ET AL  3,283,214
SEPARABLE TYPE ELECTRIC DISCONNECT
Filed March 2, 1964

United States Patent Office 3,283,214
Patented Nov. 1, 1966

3,283,214
SEPARABLE TYPE ELECTRIC DISCONNECT
Thomas B. Ortwig, Florissant, and Joseph L. Krawinkel, Jr., St. Louis, Mo., assignors to Kearney-National Inc., St. Louis, Mo., a corporation of Delaware
Filed Mar. 2, 1964, Ser. No. 348,713
7 Claims. (Cl. 317—114)

This invention relates to improvements in individual, and assemblies of individual, electric disconnects applicable to electric distribution systems, and more particularly to electric machines for such systems especially transformers of the pad mounted type. In this type of transformer, the electric components of the transformer are enclosed in a housing of the cabinet variety, which housing has a fluid tight compartment usually filled with a fluid of higher dielectric strength than air, a front panel on the housing mounting controls, and cabinet type doors for enclosing the control panel.

There are various electric distribution systems used to supply power to a plurality of transformers which step down the voltage for consumer usage, for example, three phase delta, or Y loop connected, single phase double loop connected, or single phase Y or ground connected. Regardless of the system, however, it requires each machine or transformer have electric disconnects capable of sectionalizing the high voltage power system through the loop connection, or connections, used, and also electric disconnects for isolating the machine or transformer primary from the supply of power through the loop connection with, or without, sectionalizing. Consequently, it is general practice to provide a transformer with a plurality of disconnects to accomplish these several purposes should a fault occur at any part of the distribution system. This invention provides a novel disconnect applicable individually and collectively in assemblies for the purposes described. By way of illustration, an assembly applicable to single phase, single loop connected transformers will be described in detail. This happens to be exemplary of the invention and the least complicated. Double loop connected, or three phase loop connected systems require merely a duplication of some of the elements in the individual disconnect or, duplication of disconnects of the less complicated assembly to be described here. As will appear hereinafter, an assembly includes a plurality of individual disconnects grouped for convenient installation on the high voltage side of the front panel on a transformer housing, the arrangement of the assembly and its construction is such as to be fully enclosed and tamperproof. Each disconnect in an assembly is the air break type with built in safety features achieving advantages not heretofore provided by devices of this kind.

One of the disadvantages suffered by prior air break type disconnects for transformers, or the like, has been that of size and clearance required for operation. The hinged action of prior art break type disconnects is such that when fully opened, the amount of space required in the enclosure or cabinet prevented full enclosure within a cabinet of economical size. This made the installation as a whole decidedly unsafe when the transformer was mounted at ground level. Accordingly, it is one of the objects of this invention to provide an air break type of individual disconnect for use in such an assembly which does not interfere with complete enclosure when either opened or closed and permits isolation either of the primary of the transformer or sectionalization of a part of the loop connection due to a fault.

Prior air break type disconnects for transformers have required operation by some form of tool with a load break device which will suppress the arc bound to occur during opening of a disconnect in a high voltage circuit especially one with a high inductance. Accordingly, it is one of the objects of this invention to provide a load break disconnect of the air break type with means conveniently built in to suppress the arc when the disconnect is opened.

The assembly, hereinafter described, is one containing one or more individual components which are exemplary of the improvement in the individual disconnect and also exemplary of the improvement in the manner of grouping the individual disconnects in an assembly.

Each individual disconnect is of the bayonet and socket type in which the movable contact means are two or more parallel spaced electrodes on the same side of a rigid mounting. This mounting is a conductor electrically connecting the spaced electrodes and is preferably an elongated bar of conducting metal. On the bar is an operating handle fixed on the opposite side from the electrodes. The fixed contact means are sockets which slidably receive the electrodes. The fixed contact means may be grouped together or separately located in one or more chambers of an insulated receptacle. The length of the electrodes is such, or, the socket location is such, that the contacts in any particular circuit are sequentially opened by a pull on the handle. In each circuit at least one set of contacts, which opens first, has associated therewith a load interrupter with an arc snuffer operated by movement to separate all of the contacts in the circuit to break the circuit and extinguish the arc.

A plurality of these individual disconnects are grouped with their conductor bars in radial relation. Where each bar is part of a separate circuit, the radial relationship between bars provides a compact arrangement for any number of circuits, all readily accommodated by any control panel within a cabinet type housing of the usual size. The radial arrangement can provide for a multiplicity of disconnects of various kinds within the usual space available and, as will later appear, this is an arrangement which can provide a centrally located fuse socket for fused protection of the transformer primary connection.

Other objects and advantages of the instant invention will appear from the following detailed description which is in such clear, concise and exact terms as will enable any person skilled in the art to make and use the same when taken in conjunction with the accompanying drawings, forming a part thereof, and in which:

Figure 1:
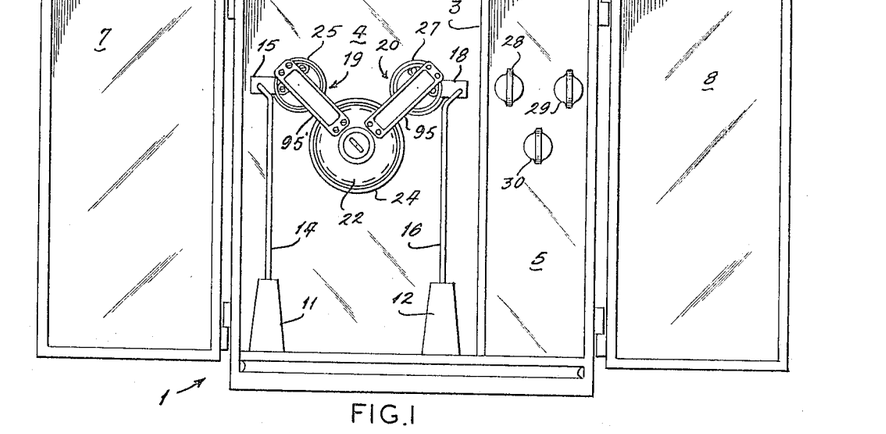
FIG. 1 is an environmental view of a transformer housing with the doors open to illustrate the installation of an assembly constructed according to the instant invention.

Turning now to the drawings, the cabinet shown in FIG. 1 has a housing part, generally indicated as 1, containing the electric components of a transformer. The housing 1 generally contains some insulating fluid. Front panel 2 of the housing 1 is divided vertically by a partition 3 to isolate the control elements on the high voltage side 4 from those on the low voltage side 5. Panel 2 is recessed so that control elements can be enclosed by a pair of swinging doors 7 and 8 hinged to opposite sides of the housing to form an enclosed cabinet. These doors can be suitably secured by a padlock, or the like, to prevent access or tampering. This is especially necessary where the transformer is a pad mounted type at ground level. Located in the front of the panel 2 are a pair of potheads 11 and 12 which contain the loop connection on the high voltage side. In other words, these potheads contain input feeders 14 extending from pothead 11 and 16 extending from pothead 12. Feeder 14 connects with a fixed terminal 15 of a loop disconnect, generally indicated as 19. The loop disconnect 20 has a fixed terminal 18 to which the input feeder 16 is connected. Disconnects 19 and 20 in turn complete a circuit from respective terminals 15 and 18 to a conductor 22 mounted on the end of a primary transformed insulator bushing 24 containing means connecting with the input feeder to the transformer primary, as will be later pointed out in detail. Terminals 15 and 18 and the disconnects 19 and 20 have contacts supported on insulators 25 and 27. These insulators 24, 25 and 27 form insulator means for mounting the disconnects.

The loop connection to the transformer is completed from the feeder loop section 14 to the feeder loop section 16 through terminal 15, disconnect 19, conductor 22, disconnect 20, terminal 18 to input feeder 16. Because of the manner of grouping of the disconnects, a compact arrangement is obtained which could handle as many as four and possibly six feeder sections. The grouping including two, shown in FIG. 1, is illustrative of this possibility.

On the low voltage panel 5 are grouped a plurality of terminals 28, 29 and 30 for the low voltage service lines from the secondary of the transformer.

Figure 2:
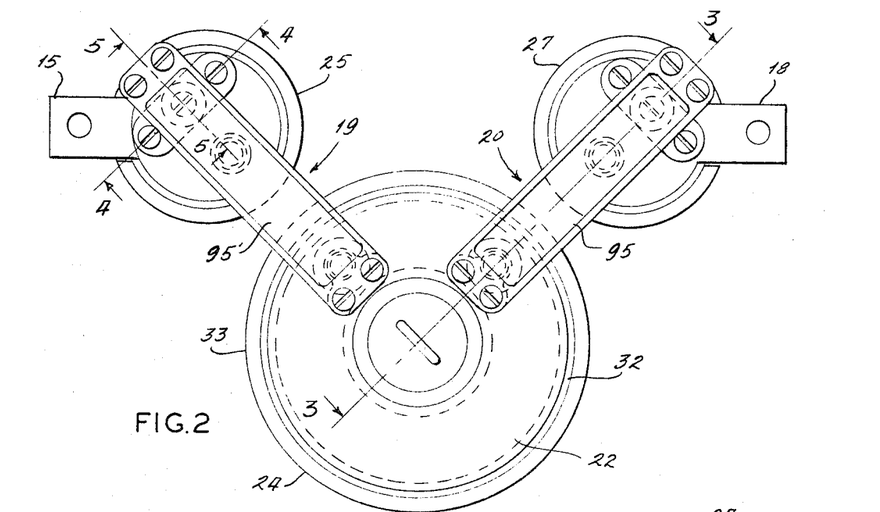
FIG. 2 is a front elevational view showing the assembly in FIG. 1 on an enlarged scale.
Figure 3:
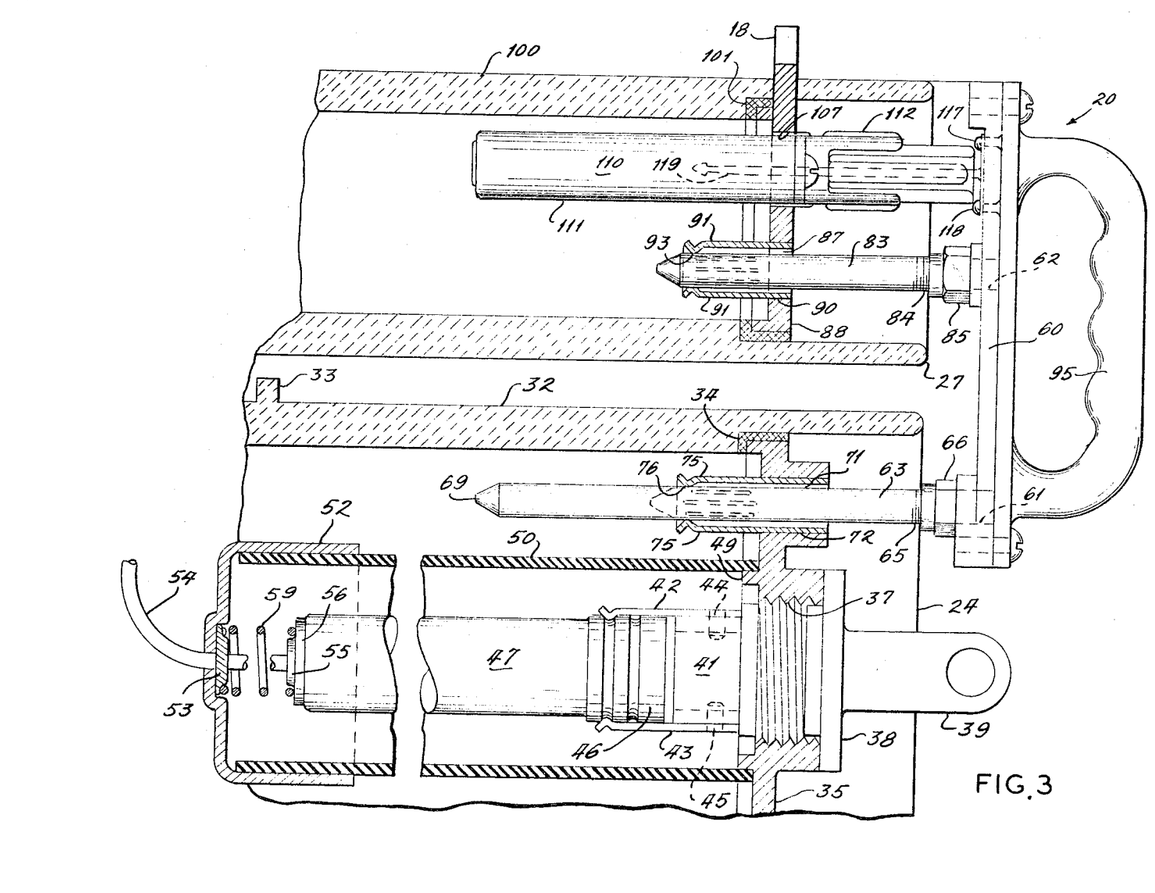
FIG. 3 is a side elevational view on line 3—3 of FIG. 2 of a loop disconnect shown in FIG. 1 with parts in section to illustrate the arrangement of the arc break device.

The assembly of disconnects 19 and 20 are shown in greater detail in FIGS. 2 and 3. A centrally located insulator bushing 24 can be constructed as a receptacle 32 of porcelain, or the like, surrounded by a mounting flange 33 for positioning the receptacle 32 within a suitable size aperture in the panel 4 of the transformer. Spaced inwardly of the outer end is an annular shoulder 34 molded in the material of the insulator 32. Recessed from the outer end of the insulator 32 and cemented in place on the supporting shoulder 34 is a metal cap 35. This metal cap has a threaded aperture 37 for a threaded plug 38. Apertured lug 39 on the plug 38 provides the means whereby the hooked end of a hot stick can be inserted in the lug and plug 38 turned so as to be removed or replaced. On plug 38 is a cylindrical extension 41 with opposed flats to which spring contacts 42 and 43 are secured, such as by suitable screws 44 and 45. The metal ferrule 46 on the end of the fuse 47 is gripped by the spring contacts 42 and 43. Depending annular flange 49 on the conductor 35 is concentric with the threaded aperture 37 and supports insulating receptacle 50. The opposite end of insulating receptacle 50 is closed by a metallic cap 52 carrying on its exterior a terminal connection 53 from which input feeder 54 leads to the primary for the transformer. Inside the cap 52 is a contact 55 spring pressed against the end of the metal ferrule 56 on the opposite end of fuse 47. Coil spring 59 is compressed between the contact 55 and the gasket 53. The circuit from metal cap 35 through plug 38, spring contacts 42 and 43, fuse 47, contact 55, and input feeder 54.

As shown in FIG. 2 and as heretofore described, the number of disconnects is wholly optional and each disconnect forms a part of the electric circuit between an input terminal, such as 15 or 18, and the conductor cap 35. In this case, there are two disconnects and both are constructed in the same manner and form a connection through exactly the same kind of means, consequently, a description of one and its connections will serve for both.

The disconnect 20, shown partly in section in FIG. 3, has a conductor blade 60 with a pair of spaced threaded apertures 61 and 62. In the aperture 61 is the threaded end of an electrode 63. The threads 65 on the electrode 63 mate with the threads in the hole 61 to secure the electrode 63 in position on the conductor blade 60. A lock nut 66 prevents the electrode 63 from turning in the aperture 61. Electrode 63 has been shown as a round rod with a pointed end 69. When a round electrode is used, then conductor cap 35 is provided with a similar shaped aperture 71 to receive the electrode. Within the aperture 71 is a sleeve 72 suitably secured to the walls of the aperture 71 and terminating in the plurality of spring fingers 75 provided with an annular contact surface 76 frictionally holding the electrode 63. It will be readily understood that the electrode 63 may be a flat blade or a square blade, in which case the contact 75 would have a complementary shape.

Spaced from the electrode 63 is a similar electrode 83 having its threaded end 84 secured in the threaded aperture 62 and held against loosening by a lock nut 85. Electrode 83 protrudes through an aperture 87 in a terminal conductor cover 88. Conductor tube 90 is wedged in the aperture 87 and is provided with a plurality of spring fingers 91 which resiliently grip the outside of the electrode 83 along the annular contact 93 of the spring fingers 91. As will be readily recognized, the spring fingers 91 and 75 form relatively fixed contact means of the disconnect 20. Electrodes 63 and 83 form the relatively movable contact means of the disconnect 20. A handle 95, preferably of insulating material, is secured to the outer face of the conductor blade 60 so as to provide for manual withdrawal and insertion of the electrodes 63 and 83 from and in their respective contact means.

Terminal conductor cover 88 is recessed within the end of an insulator receptacle 100 and supported therein on an annular flange 101 provided in the insulator receptacle. As shown, the cover 88 is secured by cement within the end of the insulator receptacle 100. Projecting from the cover 88 is the terminal 18 which provides for connection with the input feeder 16, all as shown in FIGS. 1 and 2.

Located in an aperture 107 in the terminal cover conductor 88 is a load interrupter, generally indicated as 110. The specific construction of the load interrupter 110 will be described hereinafter. This element 110 has a metal casing 111 which makes electric contact with the terminal cover conductor 88, and the casing 111 is securely attached to a fitting 112 removably secured by screws to cover 88. Also secured to the conductor bar 60 by suitable rivets, such as 117 and 118, is an electrode 119 projecting into the casing 111 of the load interrupter 110.

The parts, so far described, are so arranged that when conductor blade 60 is withdrawn by the handle 95, it breaks the circuit between electrode 83 and contacts 91 first, and transfers the load temporarily to the load interrupter 110, electrode 63 and contact 75. After the circuit is broken by the load interrupter 110, whose action will be hereinafter described, then the electrode 63 leaves the contact 75 and the handle 95 is freed.

Figure 4:
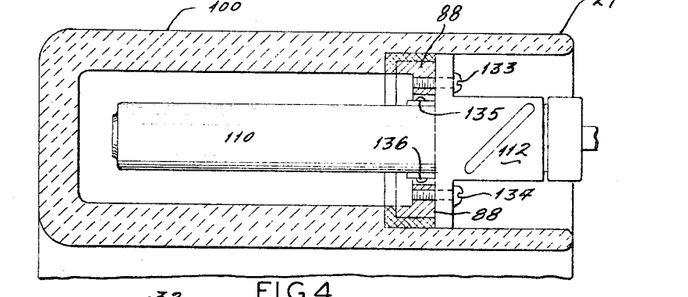
FIG. 4 is a transverse sectional view taken on the line 4—4 of FIG. 2 looking in the direction of the arrows.
Figure 5:
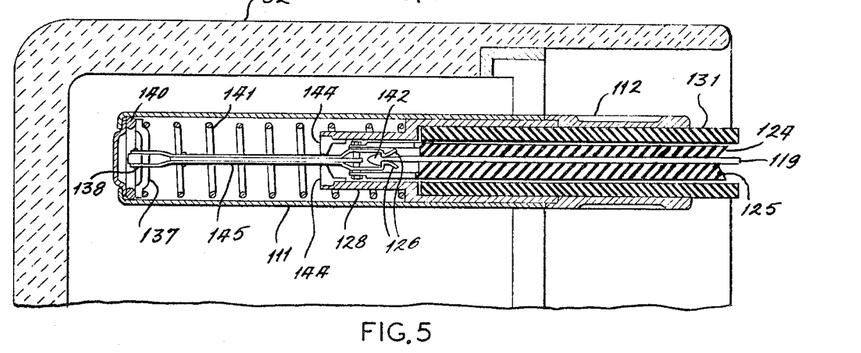
FIG. 5 is a transverse sectional view taken on the line 5—5 of FIG. 2 looking in the direction of the arrows.

The load interrupter mounted within the receptacles 25 and 27 and its mounting are shown in more greater detail in FIGS. 4 and 5. With reference to FIG. 4, the insulator receptacle 100 in insulator 27 carries the metal cover 88 recessed within its upper end. Protruding inwardly and outwardly of the cover 88 is the load interrupter 110 held secured to the cover 88 by a pair of screws 133 and 134 threaded into the cover and through the flange of the tubular fitting 112. The internal construction of the load break or interrupter 110 is shown more in detail in FIG. 5. Within fitting 112 is a tubular plastic sleeve 131. This sleeve in turn is mounted within a tubular metal housing 128 and secured thereto in any desired manner. Around the housing 128 is the metal tube 111 which has its upper end held secure to the fitting 112 by a pair of rivets, or the like, 135 and 136. Housing 128 is held stationary within the metal tubular casing 111. Snuffer elements 124 and 125 are slidable within the sleeve 131 which is fixed in the housing 128. Within the housing 128 are a pair of spring contacts 126 which are in turn connected by link 145 to a plunger 137 with a pin 138. A rubber O-ring 140 forms a cushion-like stop for the plunger 137 which is urged against that stop by the coil spring 141. The contact, or electrode, 119 which is movable with the contact blade 60 has a bulbous end 142 which is held between the spring contacts 126. Brushes 144 (see FIG. 6) ride against the sides of link 145 which connects with the contacts 126 so as to establish an electric circuit from contacts 126 through brushes 144 to housing 128 and from there to the fitting 112 and the metal cover 88.

Figure 6:
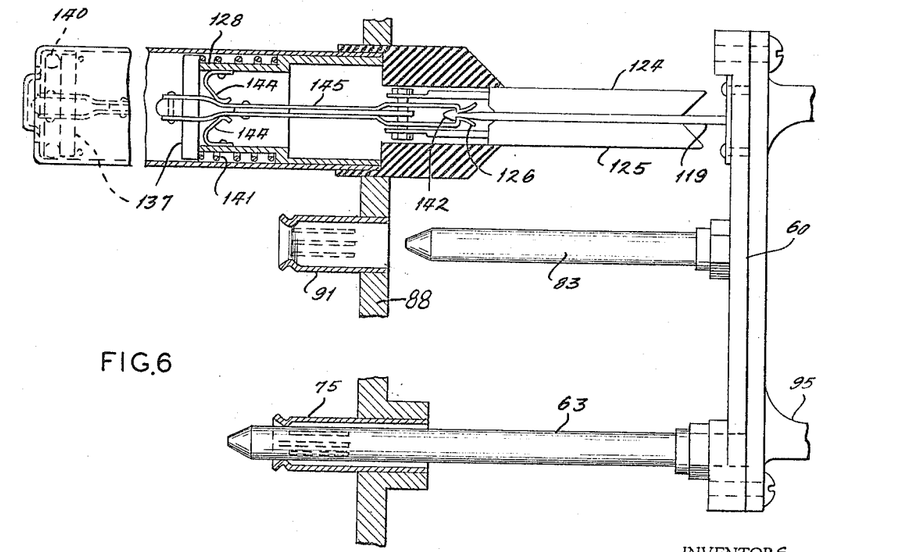
FIGS. 6 and 7 are schematic views illustrating the operation of a loop disconnect.
Figure 7:
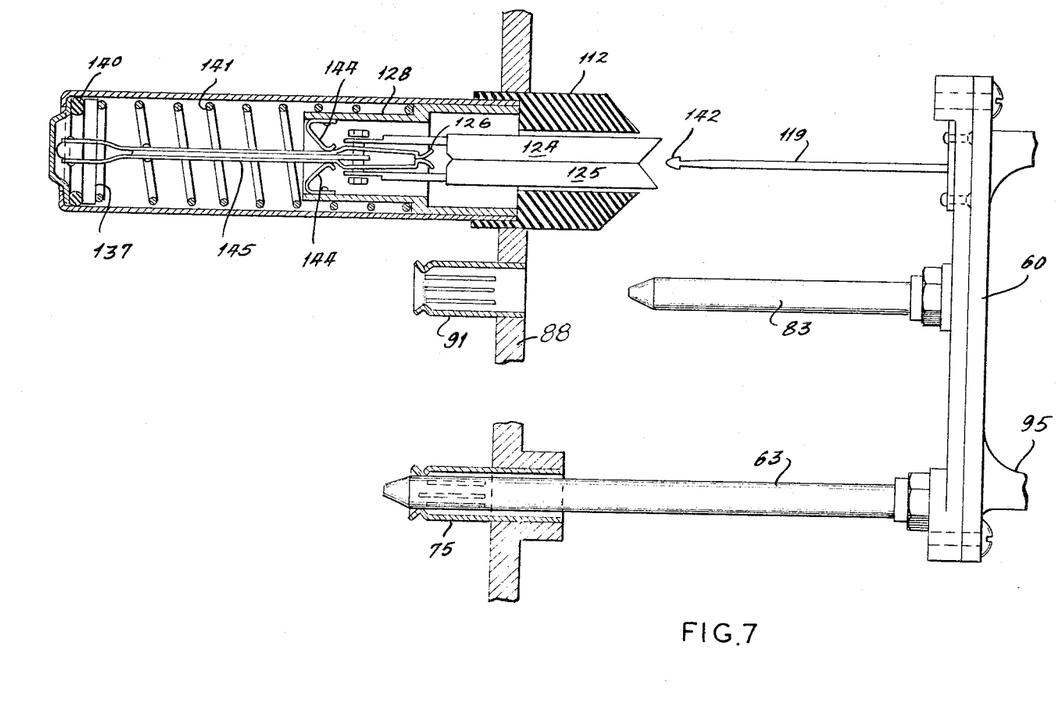

The operation of the load interrupter 110 is shown by the schematic representation in FIGS. 6 and 7. In FIG. 6, the blade conductor 60 has been withdrawn by the handle 95 so as to move electrode 83 out of fixed contact 91. During the withdrawal of the movable blade 60, the contact means are separated in sequence, first electrode 83 is separated from fixed contact 91 and then the electric load is transferred from electrode 83 to electrode 119 and socket 126 of the load interrupter 110. During this movement, electrode 119 moves outwardly of the stationary contact cover 88, but, because electrode 119 has a bulbous end 142, the socket formed by spring contacts 126 is moved with the electrode 119. This movement of the socket formed by the spring contacts 126 is in turn resisted by the spring 141. This spring 141 is compressed, however, and permits the movement of the spring contacts 126 with the electrode 119 until the plunger 137 strikes the end of the housing 128.

When the parts reach the position shown in FIG. 6, movable contact 83 has separated from fixed contact 91, and, during the short subsequent interval, the electric load is transferred through the circuit established between stationary contacts 75, electrode 63, blade 60, electrode 119, spring contacts 126, brushes 144, housing 128, to the fitting 112 and cover 88. As shown in FIG. 6, plunger 137 has now reached the limit of its travel, and further movement of the blade 60 will cause the bulbous head 142 to force apart the spring contacts 126 and contact will be broken at this point.

The position of the parts after contact is broken is illustrated schematically in FIG. 7. Spring 141, which has been hitherto fully compressed, is triggered by the release of the bulbous head 142 from between the spring contacts 126 and expands driving the plunger 137 against the cushion ring 140. The movement of the plunger in turn retracts the bar 145 and the spring contacts 126 carry with them the snuffers 124 and 125. These snuffers move over the surface of the electrode 119 and are spread apart on their resilient mountings by the bulbous end 142. Once the snuffers 124 and 125 pass the bulbous end, however, the same resilient mountings close them tightly face to face and thereby pinch off any arc which is formed between the bulbous end 142 and the spring contacts 126. Preferably, the snuffers are of a resin material which will generate an arc quenching gas. Further movement of blade 60 then withdraws electrode 63 from stationary contact 75. When the blade 60 has withdrawn all of the contacts, it may be completely removed from the panel and thereby prevent any unauthorized tampering. If it is desired to replace the blade 60, the sequence of events taking place is just the reverse of the above described. During reengagement, electrode 63 is the first to make contact with the stationary contact 75. Thereafter contact 83 completes the circuit through the stationary contact surface 91. After electrode 83 engages its fixed contact 91, the bulbous end 142 penetrates between the spring contacts 126 on final closing of the electrodes into the fixed, or stationary, contacts.

Assuming that the instant invention is applied to a transformer as herein described in detail, then the operation intended is as set forth. Should a fault occur in the distribution system of which the transformer is a part, the doors 7 and 8 can be unlocked and opened by authorized service personnel. Possibly there are indications from which the fault suspected is the fuse in the transformer primary and replacement seems to be called for. The hot stick is hooked into one of the handles 95 or 95' and the loop disconnects 19 and 20 are pulled out and removed one at a time. For the reasons which appear above, arcing of disconnects 19 and 20 is not a hazard. The same hot stick can then be hooked through lug 39 and twisted to remove plug 38 safely and without an arcing hazard because no power is connected. If the fuse needs replacement, a new one is inserted between contacts 42 and 43 and plug 38 screwed into the cap conductor opening 37. Loop disconnects are reclosed by forcing first one and then the other into closed position. If the fault is cured, the doors are closed and locked.

There is the possibility that a fault can occur in the loop connected service lines to feeder 14, or feeder 16. Should this occur, then using a hot stick, the serviceman would remove both disconnects 19 and 20, refuse and then insert the disconnects, one at a time, to locate the fault. Once a fault is located, it may be necessary to sectionalize the loop connection to isolate the fault during repair. As an example, if it is desired that feeder 14 be de-energized, then disconnect 19 is removed, and the door closed and locked to prevent tampering. Once the disconnect 19 is wholly removed, there is no chance of an accident because the circuit cannot be reclosed if a part of the disconnect is missing, even if the key to the cabinet is available to others.

Figures 8, 9:
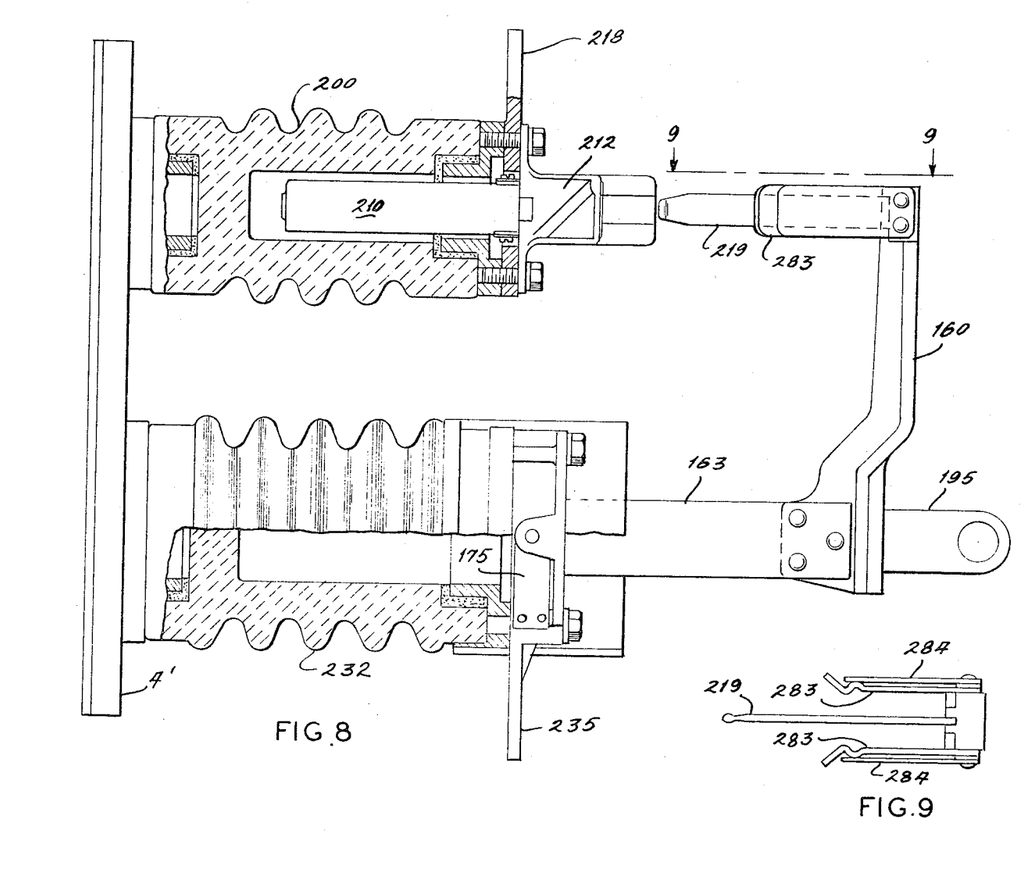
FIG. 8 is a side elevational view partly in section showing a modified form of the invention.
FIG. 9 is a fragmentary top view of FIG. 8.

The structure just described is capable of considerable modification without change in function or loss of advantages inherent in the first described construction. FIGS. 8 and 9 illustrate one of these modifications, and this description of the modification therein shown will be limited to the differences so as to simplify the description. Corresponding parts in this form will be indicated by like reference characters with 100 or 200 added where possible without conflict. Panel 4' in this form mounts to spaced insulators 200 and 232. Insulator 200 is a receptacle mounting the load interrupter 210. Insulator 232 is a receptacle mounting the relatively stationary contacts 175. Electrode 163 mounted on the blade 160 is a flat bar which is received between a pair of relatively stationary contacts 175 as it is forced into the insulating receptacle 232. Fixed terminal 235 corresponds generally to conductor 35 in the prior modification and is electrically connected with the fixed contacts 175. Blade 160 carries a pull ring 195. The opposite end of the blade 160 carries an electrode 219 received by the load break device 210, and, in this form, the load break device 210 has opposite stationary contact faces 212 forming stationary contacts. On the blade 160 are a pair of movable contacts 283 which straddle fixed contacts 212 and are held in engagement therewith by the springs 284.

In this form, when the blade 160 is forced all the way to the left, electrode 163 slides into, or between, stationary contacts 175, and movable contacts 283 grip the stationary contacts 212 on opposite sides of the load interrupter 210. As in the prior modification, electrode 219 engages within the movable socket of the load interrupter 210. When the blade 160 is pulled away from the stationary contacts, the load is transferred from movable contacts 283 to electrode 219 as the movable contacts leave stationary contacts 212. Thereafter the load interrupter 210 operates breaking the circuit, and blade 160 is freed from contacts 175.

Figure 10:
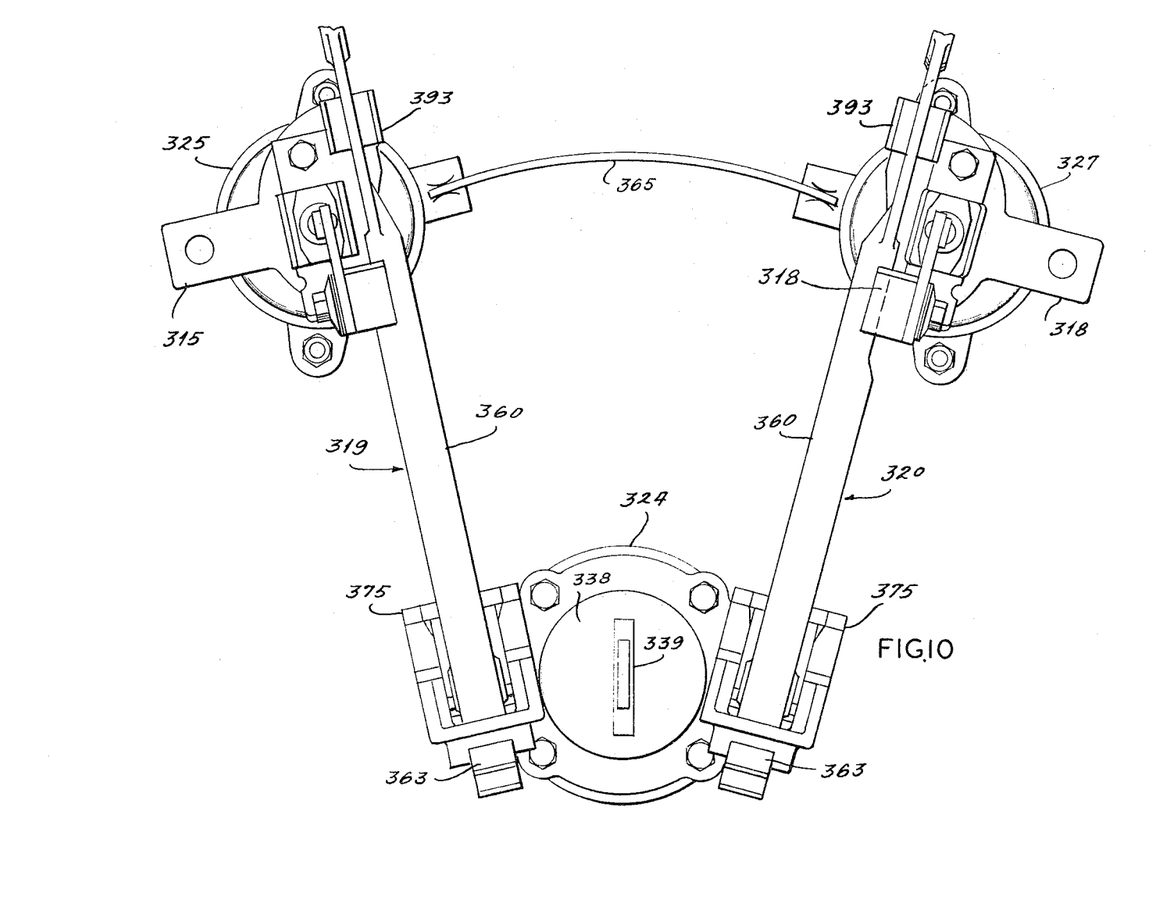
FIG. 10 is a front elevational view of still another modified form for the invention.
Figure 11:
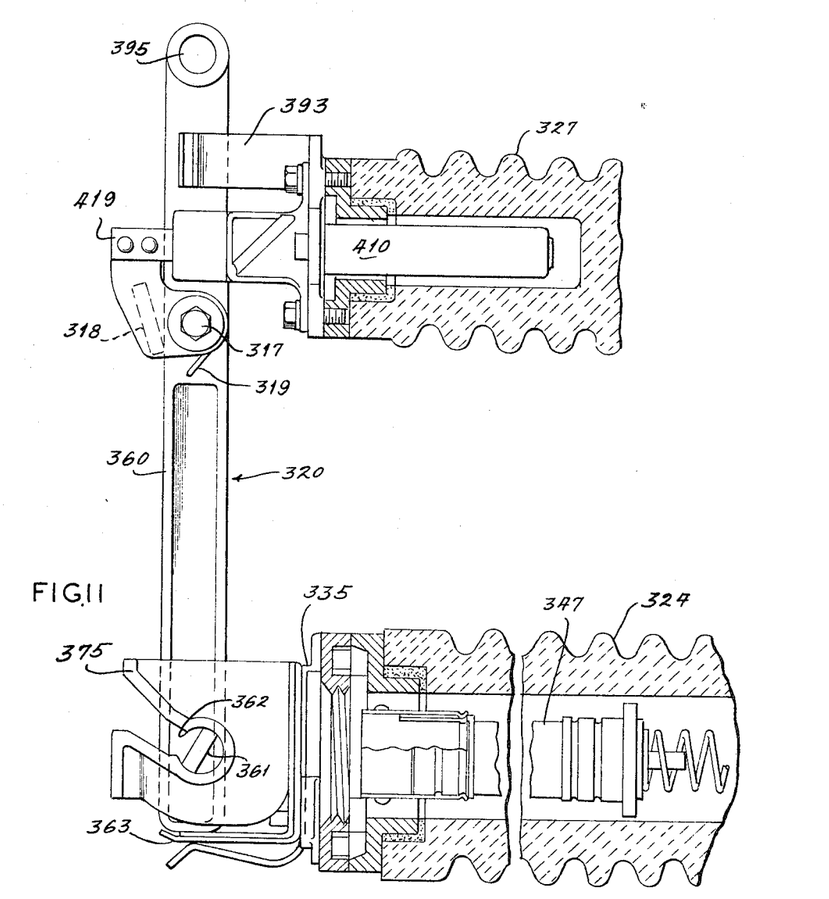
FIG. 11 is a side elevation of the construction shown in FIG. 10.

In the form shown in FIGS. 10 and 11, similar parts to those shown in FIGS. 1–3, etc., will be indicated by the same reference characters with 300 added. This description will be confined to the differences between this form and that heretofore described. The blade 360 has no spaced electrodes as in the preceding forms, instead the blade 360 is received between spring pressed contacts 363 at one end and 393 at the other. Fixed contacts 363 are mounted on the conductor 335 supported by hollow insulator post 324. The fuse structure 347 is identical with that heretofore described.

Blade 360 has a transverse pin 361 projecting from its opposite sides and received in a key-shaped slot 362 in brackets 375. The opposite end of blade 360, however, carries an electrode 419 received within a load interrupter 410, such as heretofore described. Insulating receptacle 327 forms the housing for the load interrupter 410. A pull ring 395 on the blade 360 permits the use of a hot stick to swing the blade 360 about the pins 361. As the blade 360 leaves the contacts 393, the circuit is then transferred from contacts 363 to blade 360 and electrode 419 to load interrupter 410. Further hinging movement of the blade 360 in the same direction breaks the circuit by removing the electrode 419 from the load interrupter and arc suppressor 410 and snuffs out the arc. Thereafter blade 360 may be removed completely from bracket 375 and spring contacts 363.

To reconnect the circuit just described, the pins 361 are inserted in the keyhole slot 362 of bracket 375, and blade 360 thereafter swung about the pin 361 as a hinging point to engage first fixed contacts 363 and thereafter fixed contacts 393 with the blade 360. During this movement, electrode 419 reconnects with the socket connection within the load interrupter 410. The hanger on which the electrode 419 is mounted is in turn hinged on a stud 317 and biased by a torsion spring 319 in a clockwise direction as viewed in FIG. 11. Tongue 318 limits the movement of electrode 419 so that it is held in a rectilinear relation to blade 360 as in FIG. 11. When the electrode 419 is disconnected, spring 319 rocks the electrode 419 to an angular position determined by tongue 318 proper for entering the arc suppressor 410 as the blade 360 swings closed.

As FIG. 10 shows, it may be desirable to use a jumper, such as conductor 365, between the contacts so as to directly connect the two terminals 315 and 318 electrically one with the other to form a direct electrical connection before both loop disconnects are removed. With slight modification, the same type jumper can be applied to each of the structures shown especially when the disconnects are removed.

Figure 12:
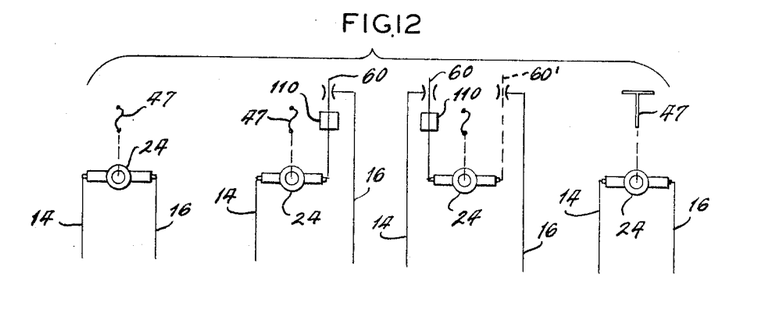
FIG. 12 is circuit diagrams showing possible operational variants.

Turning now to FIG. 12, the first wiring diagram shows the electrical circuit used in case the loop disconnects are not required. In such a circuit feeder 14 and 16 can be connected directly with fixed terminals on insulator 24. This can be done by a plug in connection on the ends of the feeders into fixed contacts 75 in FIG. 3, or 175 in FIG. 8, or by a bolted connection with fixed contacts 363 in FIG. 10. If this diagrammed circuit is used, the fuse may be removed to isolate the transformer as indicated by the right wiring diagram. This basic hook up may be subsequently modified by adding a single loop disconnect 60, 160, 360 and its arc suppressor 110, 210, 410 as shown in the wiring diagram at the left center of FIG. 12. The electric circuit would then be also modified by shifting the connection of feeder 16 from that shown on the left to that shown at left center in FIG. 12.

A still further modification of the electric hook up is shown in the right center wiring diagram which is applicable to a choice of equipment including one loop disconnect 60, 160, 360, one arc suppressor 110, 210, 410 and a dummy blade 60'. Since any of these alternative hook ups may be desirable, the invention is made up of separate parts so that the desired units may be selected to suit the needs of various application, or desired units may be added to an original installation such as shown at extreme left or right in FIG. 12.

Changes in and modifications of this invention may be made without departing from the spirit of the invention or sacrificing its advantages.

Having thus described the invention, what is claimed and desired to be secured by Letters Patent is:

1. In a panel mounted assembly for an air break type of electric disconnect including a conductor with an output connection to an electric machine and terminal means with an input connection to a high voltage feeder, the improvement comprising;
   (a) a plurality of fixedly mounted insulators including an insulator receptacle means,
   (b) a plurality of relatively stationary contact means on said insulators respectively, said contact means being connected with said conductor and with said terminal means respectively,
   (c) movable contact means including a conductor blade having a plurality of spaced contact means for releasable cooperation respectively with different ones of said stationary contact means to electrically connect said stationary contact means through said conductor blade,
said stationary contact means and said movable contact means being arranged to separate sequentially from their respective cooperating stationary contact means upon movement of said conductor blade relative to said insulators,
   (d) an arc suppressor in said receptacle means and having a conductive member permanently electrically connected with the one of said stationary contact means which is sequentially first to separate from its cooperating movable contact during opening movement of the latter,
said conductive member being mounted for limited movement relative to the stationary contact means with which it is permanently electrically connected, said limited movement being in the general direction of the opening movement of said blade, and said conductive member having means for releasably gripping one of said spaced contact means while another thereof is in contact with its cooperating stationary contact means and maintaining such gripping until after said another has broken such contact,
   (e) means in said arc suppressor, responsive to further opening movement of said conductor blade, to separate said conductive member from the one of said spaced contact means gripped by it, and
   (f) insulated barrier means in said arc suppressor disposed to surround the gripped one of said spaced contact means upon release thereof by said conductive member.

2. The combination defined in claim 1 in which said conductive member constitutes one of said relatively stationary contact means which is first to open.

3. The combination defined in claim 1 in which said conductive member provides one of said relatively stationary contact means which is first to open and is connected in parallel with other of said relatively stationary contact means and movement of said conductor blade separates said parallel connected contact means sequentially.

4. The combination with the assembly defined in claim 1 of a tubular open ended casing in said arc suppressor electrically connected to said conductive member, a spring for retaining said conductive member in said casing, an arc snuffer device slidable in said open ended casing and movable with said conductive member and slidable over the one of said spaced contact means gripped by said conductive member, and means for limiting the compression of said spring to cause separation of said conductive member and said one of said spaced contact means during movement toward the open end of said tubular casing and retraction of both said conductive members and said arc snuffer device into said casing.

5. The combination as defined in claim 1 in which said movable contact means including a conductor blade is constructed as separable units and removable from all of said relatively stationary contact means.

6. The combination with the assembly of claim 1 of a fuse mounted in the insulator receptacle means of one of said fixedly mounted insulators, said fuse forming part of the electrical connection between said conductor and said terminal when said disconnect is in closed circuit position.

7. The combination of claim 1 wherein said blade is hingedly mounted on one of said insulators, and said arc suppressor is in the receptacle means of another of said insulators.

References Cited by the Examiner

UNITED STATES PATENTS 3,070,680  12/1962  McBride et al. ________ 200—46

FOREIGN PATENTS 335,548  10/1930  Great Britain.

ROBERT K. SCHAEFER, *Primary Examiner.*
ROBERT S. MACON, *Examiner.*
M. GINSBURG, *Assistant Examiner.*

UNITED STATES PATENT OFFICE
CERTIFICATE OF CORRECTION

Patent No. 3,283,214 November 1, 1966

Thomas B. Ortwig et al.

It is hereby certified that error appears in the above numbered patent requiring correction and that the said Letters Patent should read as corrected below.

Column 1, line 56, for "art" read -- air --; column 3, line 21, for "transformed" read -- transformer --; column 8, line 72, for "members" read -- member --.

Signed and sealed this 5th day of September 1967.

(SEAL)
Attest:

ERNEST W. SWIDER
Attesting Officer

EDWARD J. BRENNER
Commissioner of Patents